United States Patent
Stabel et al.

(10) Patent No.: US 7,306,409 B2
(45) Date of Patent: Dec. 11, 2007

(54) CUTTING INSERT HAVING A RAKE SURFACE AND A PLATEAU SURFACE SEPARATED BY A STEP

(75) Inventors: Thorsten Stabel, Mossingen (DE); Hans-Peter Dürr, Gomaringen (DE)

(73) Assignee: Walter AG, Tubingen (DE)

( * ) Notice: Subject to any disclaimer, the term of this patent is extended or adjusted under 35 U.S.C. 154(b) by 0 days.

(21) Appl. No.: 10/826,311

(22) Filed: Apr. 19, 2004

(65) Prior Publication Data
US 2004/0208714 A1    Oct. 21, 2004

(30) Foreign Application Priority Data
Apr. 17, 2003 (DE) .................. 103 17 760

(51) Int. Cl.
*B23B 27/16* (2006.01)
(52) U.S. Cl. .................. 407/113; 407/115; 407/116
(58) Field of Classification Search ............... 407/113, 407/115, 116
See application file for complete search history.

(56) References Cited

U.S. PATENT DOCUMENTS

| 4,315,706 A | * | 2/1982 | Erkfritz ........................ 407/101 |
| 4,915,548 A | | 4/1990 | Fouquer et al. |
| 5,032,049 A | * | 7/1991 | Hessman et al. ............ 407/113 |
| 5,192,171 A | * | 3/1993 | Ther et al. ................... 407/114 |
| 5,230,591 A | * | 7/1993 | Katbi et al. .................. 407/114 |
| 5,324,144 A | * | 6/1994 | Katbi et al. .................. 407/114 |
| 6,234,726 B1 | * | 5/2001 | Okada et al. ................ 407/114 |
| 6,238,146 B1 | | 5/2001 | Satran et al. |
| 6,336,776 B1 | * | 1/2002 | Noggle ........................ 407/34 |
| 6,422,931 B1 | | 7/2002 | Laflamme |
| 2004/0202515 A1 | * | 10/2004 | Satran et al. ............... 407/113 |
| 2005/0042044 A1 | * | 2/2005 | Satran et al. ............... 407/113 |

FOREIGN PATENT DOCUMENTS

| DE | 93 20 448.5 U | 7/1994 |
| DE | 196 53 921 | 7/1997 |
| GB | 1 154 754 | 6/1969 |

* cited by examiner

*Primary Examiner*—Monica Carter
*Assistant Examiner*—Sara Addisu
(74) *Attorney, Agent, or Firm*—Drinker Biddle & Reath LLP

(57) ABSTRACT

A cutting insert intended exemplarily for use in a face-milling cutter, has an all-around extending rake surface which changes into a plateau surface by an uninterrupted step. The step reaches its greatest height in the corner regions of the cutting insert. The rake surface defines a positive rake angle. The step prevents the produced chips from running onto the plateau surface. As a result of such a measure, a smear-on of material onto the plateau surface from a chip is prevented.

22 Claims, 8 Drawing Sheets

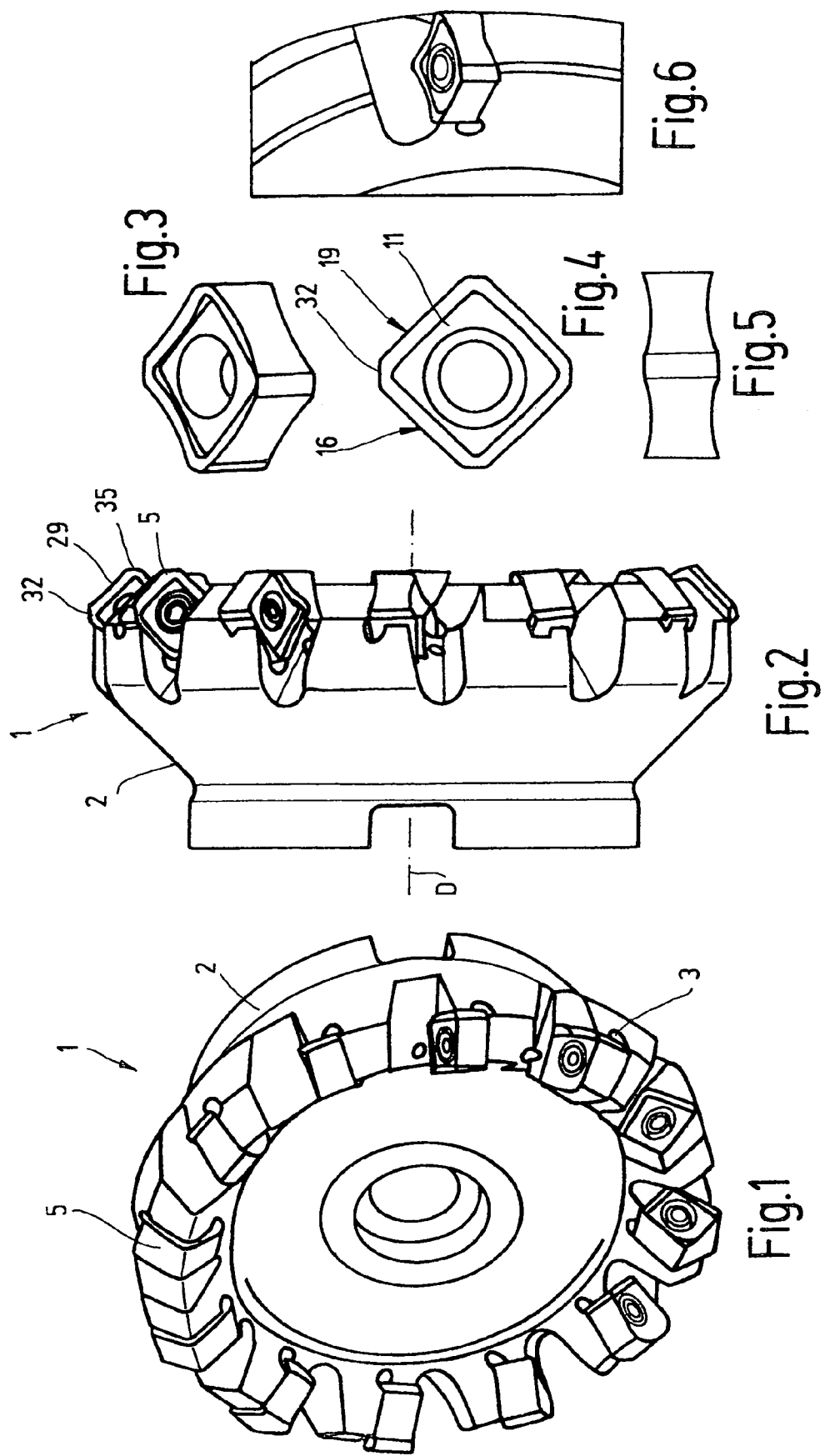

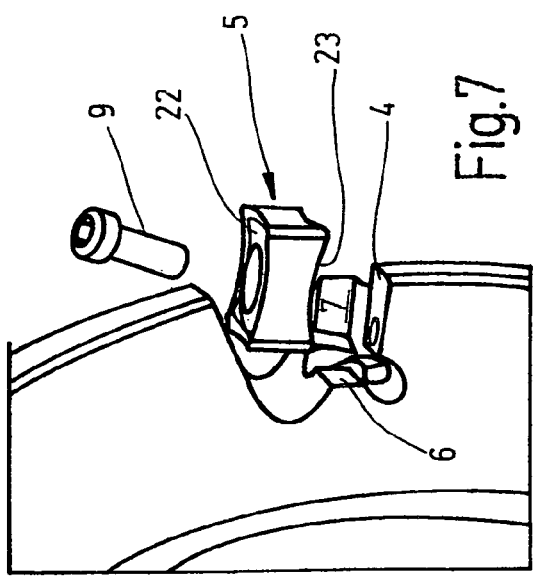
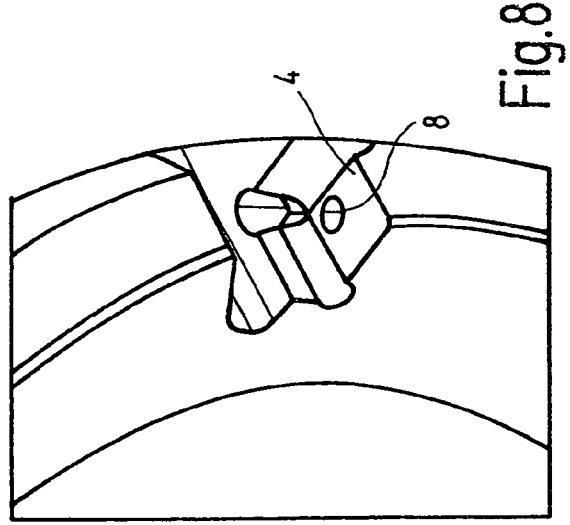
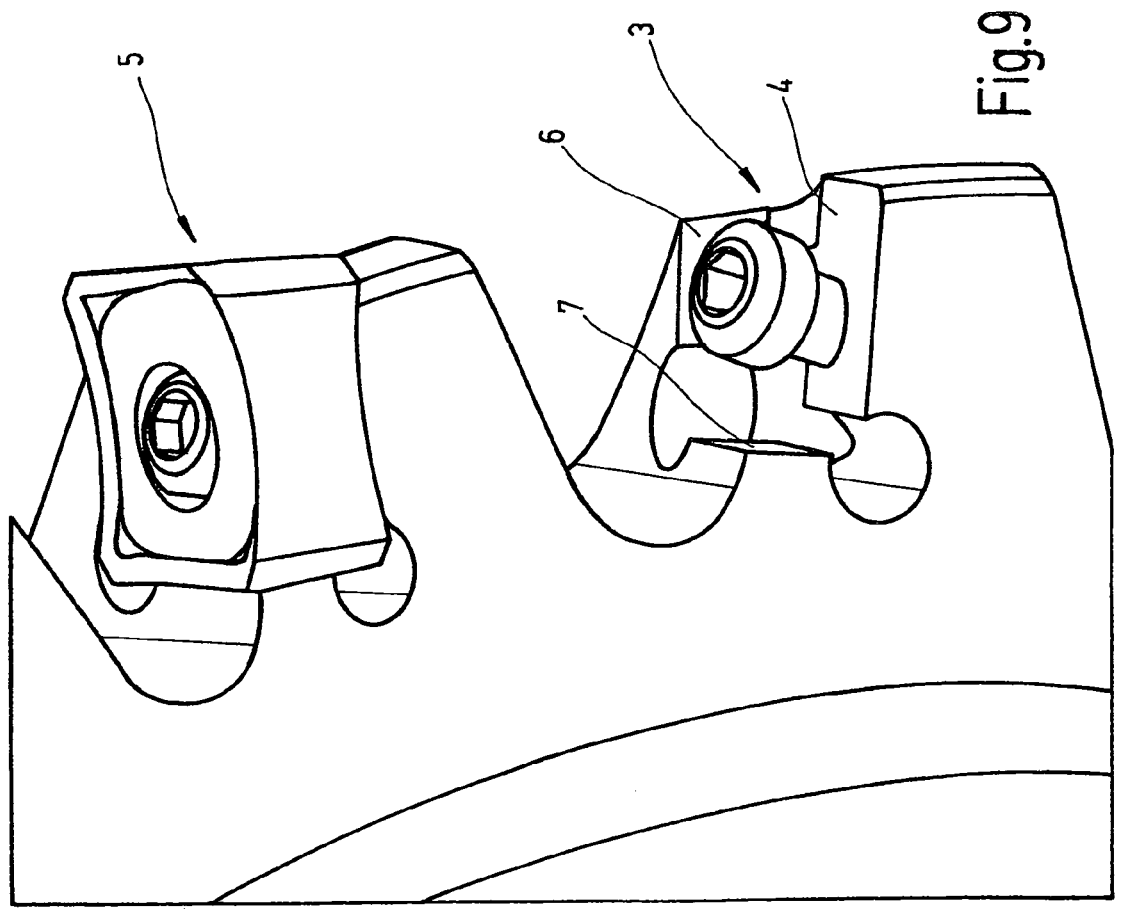

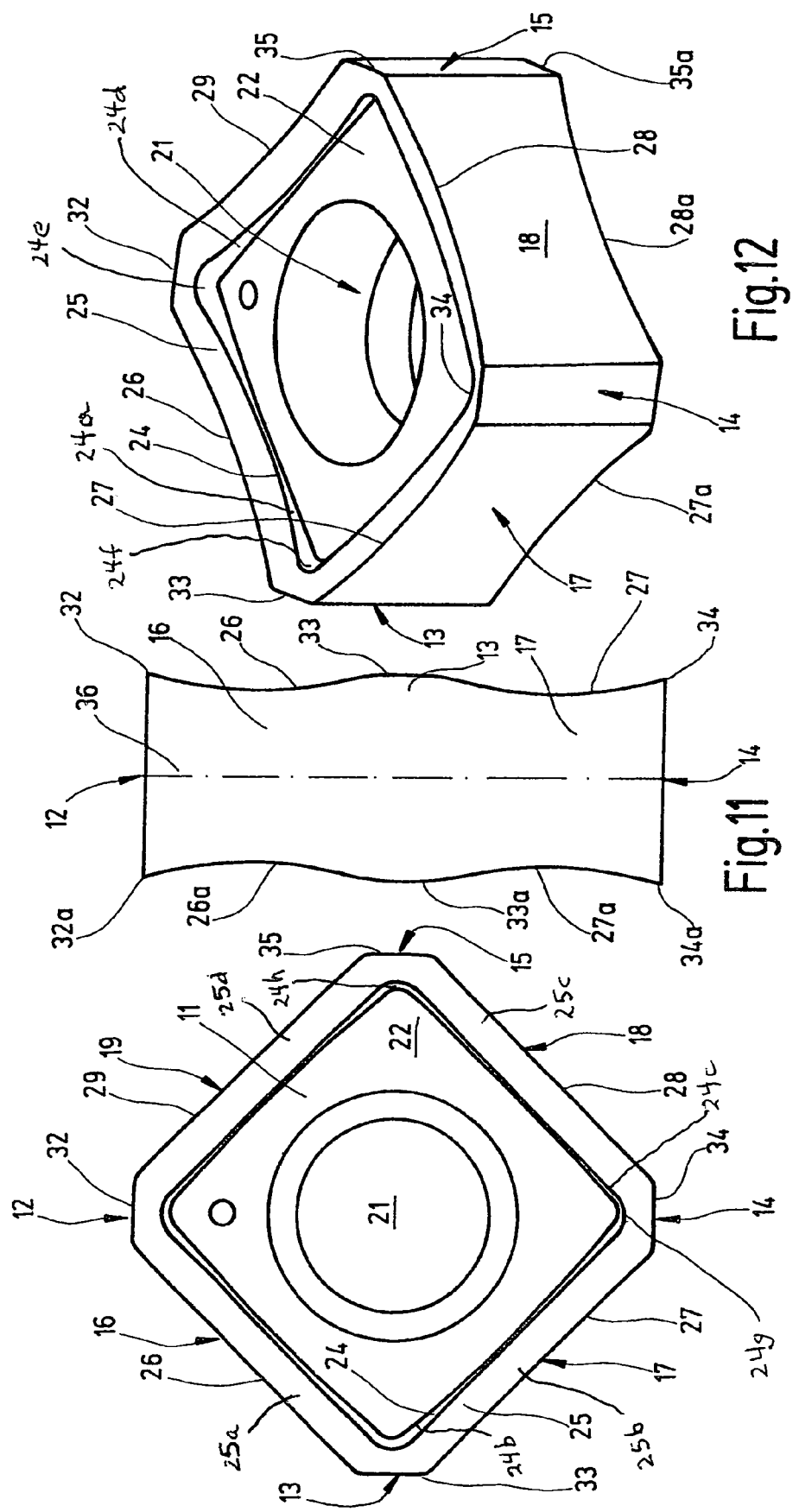

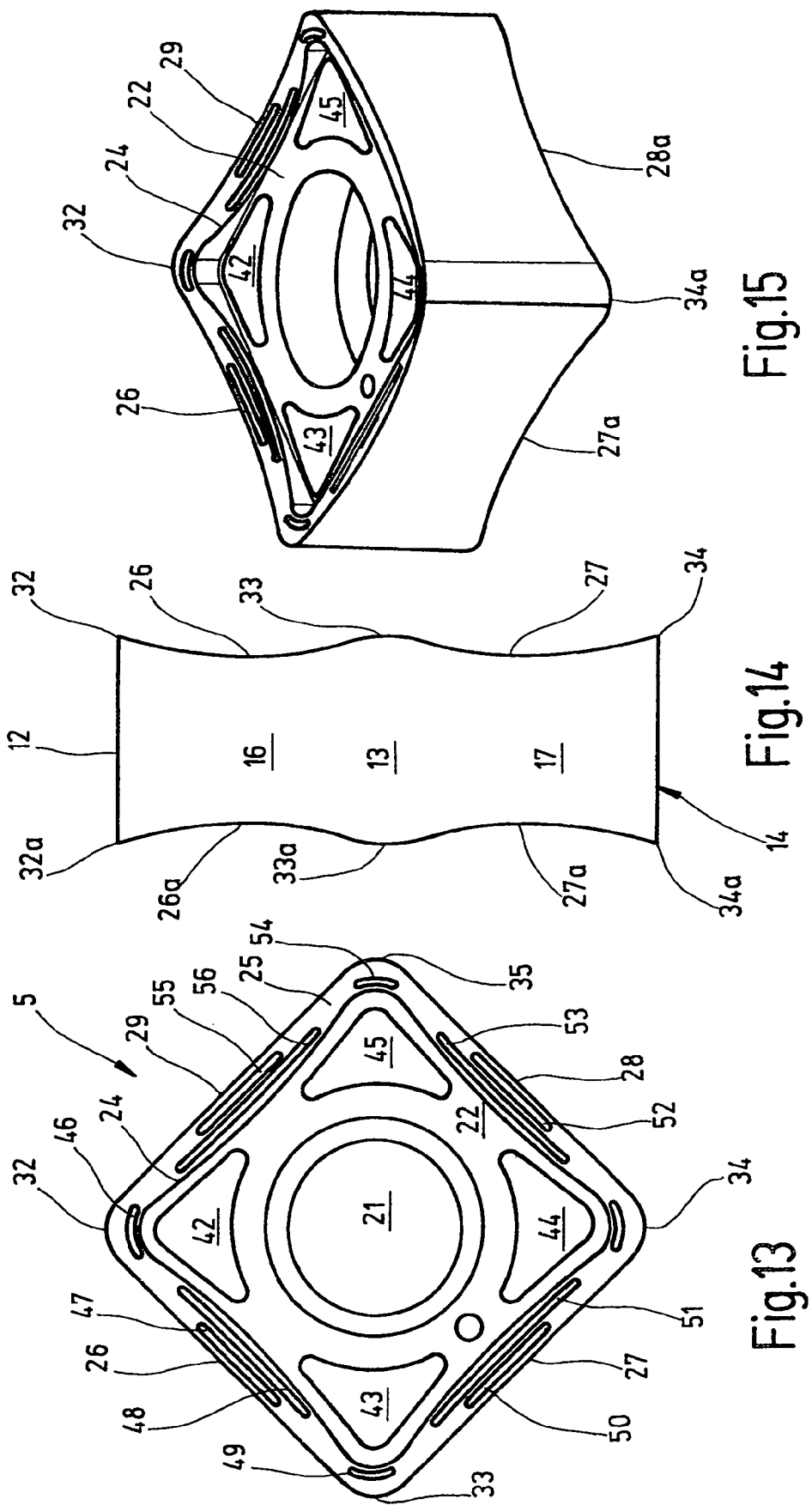

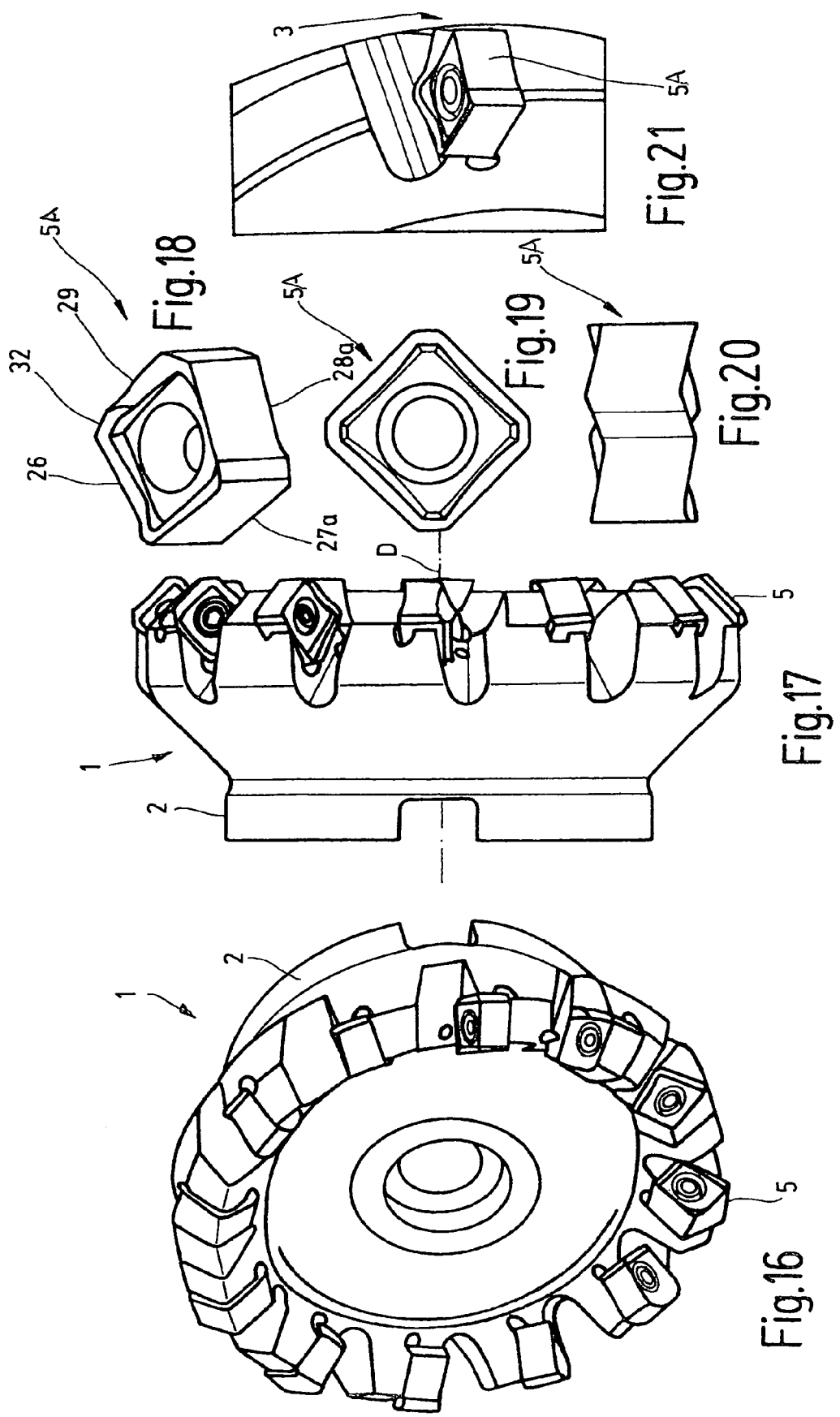

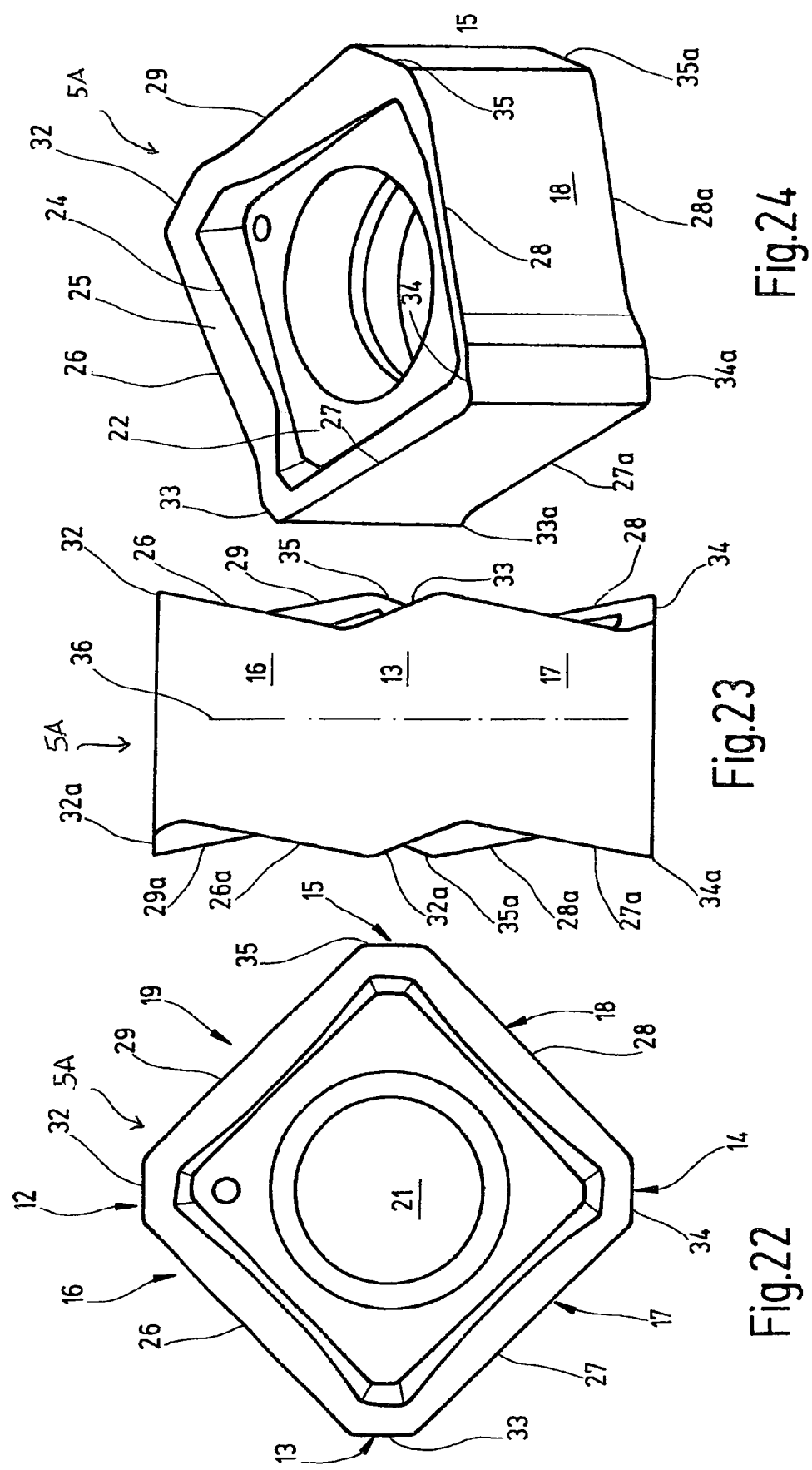

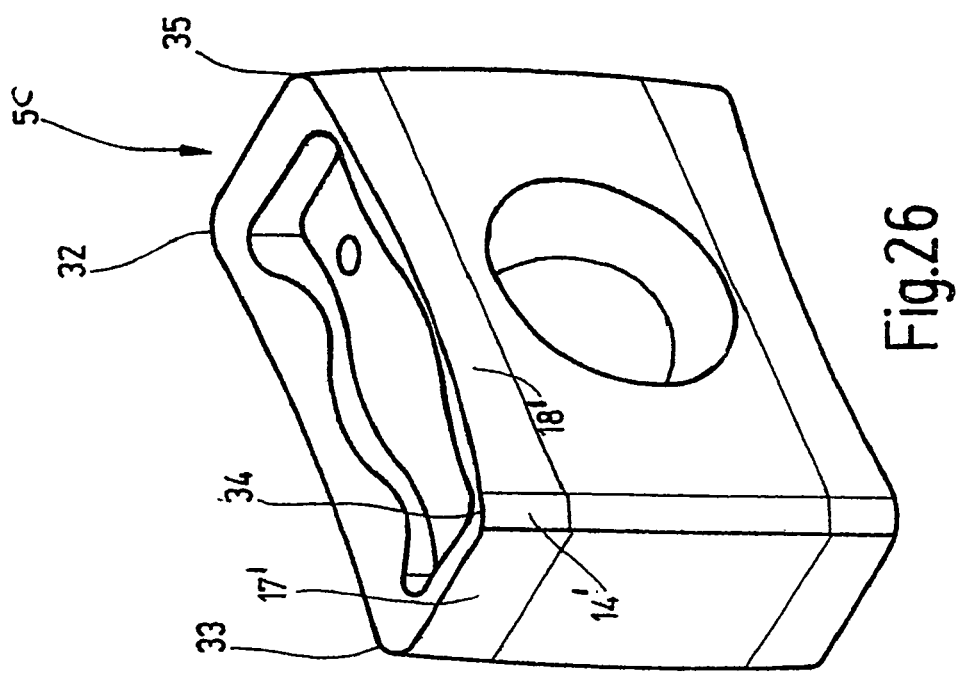
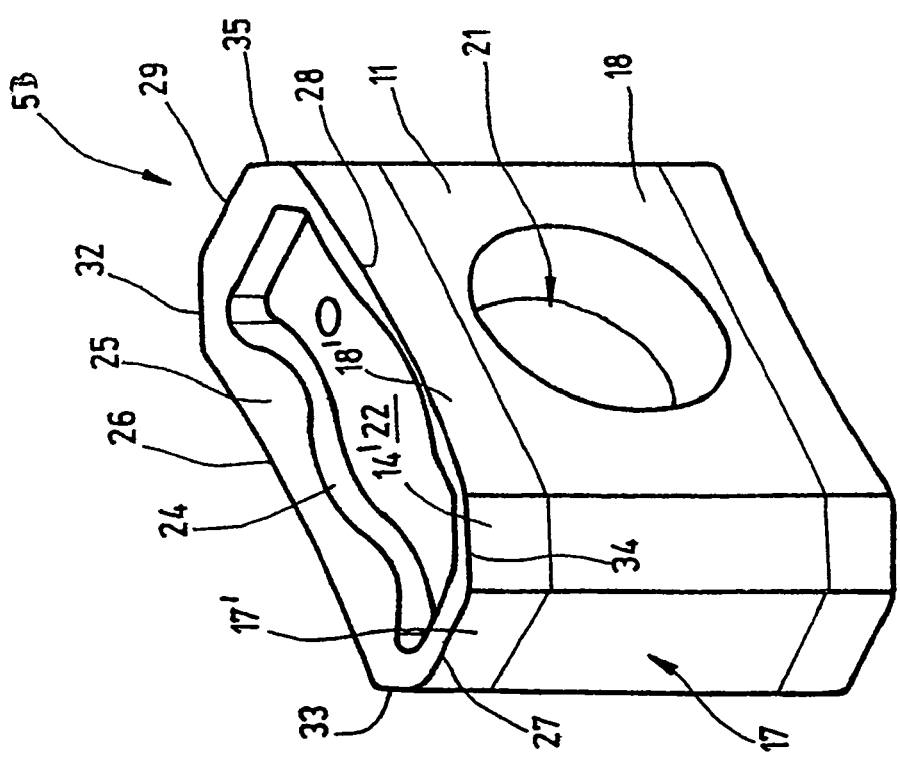

CUTTING INSERT HAVING A RAKE SURFACE AND A PLATEAU SURFACE SEPARATED BY A STEP

The present application claims priority under 35 U.S.C. § 119 to Patent Application Serial No. 103 17 760.4 filed in Germany on Apr. 17, 2003, the entire content of which is hereby incorporated by reference.

BACKGROUND OF THE INVENTION

The invention relates to a cutting insert, for example, for a milling tool, particularly a face-milling cutter.

Milling tools are often provided with cutting inserts made of hard metal or other hard material optimized concerning their cutting properties. On the cutting inserts cutting edges, clearance surfaces and rake surfaces are formed, whose shape significantly affects the performance of the cutting insert tool. At the same time, consideration is given to the chip flow, that is, to the manner in which the chips are formed and how they run over the rake surface which adjoins the cutting edge.

It has been found that during chip breaking some materials tend to leave deposits on surfaces over which they run. Such an occurrence is referred to as "smear-on". A material accumulation occurring by smear-on may be disadvantageous for several reasons. If, for example, the cutting insert is provided with a wear-reducing coating, the latter may be endangered by a material accumulation. If the material accumulation grows excessively large and is entrained by the chips sweeping thereover, under certain circumstances damage to the coating may occur. Further, material may accumulate on surfaces or surface regions which, in a different orientation of an invertible cutting insert, may serve as indexing or supporting surfaces. A material accumulation on such surfaces thus results in a faulty positioning which is to be avoided.

German patent document DE 196 53 921 A1 describes a triangular invertible cutting insert which has an all-around extending cutting edge joined by a rake tray, that is, a tray-shaped rake surface. The rake surface changes into a top surface which lies below the cutting edge. The top surface is, nevertheless, situated in the region of chip flow, so that at such a location material accumulation may occur.

The above-noted German patent document further discloses, in top plan view, four rhomboidal cutting inserts having an all-around extending cutting edge. Again, a rake surface joins the cutting edge at a positive rake angle. In the obtuse corner regions of the rhomboidal insert the rake surface changes in a stepless manner into a planar supporting surface which lies below the cutting edges. In the acute-angle corners, the rake surface, which is immediately adjacent the corner cutting edge, is adjoined by a plateau which, in turn, changes into the supporting surface with a step. The outwardly concave, obtuse angle between the rake surface and the plateau causes the chips to run against the plateau surface where they may form deposits.

British Patent 1,154,754 discloses a lathe tool including a cutting insert which has a square-shaped base outline and four side surfaces arranged at right angles to one another. The side surfaces border cutting edges arranged as a square. The cutting edges are adjoined by rake surfaces which are raised with respect to a planar top surface of the cutting insert and are thus separated from the top surface by an all-around extending step. The latter extends along the rake surfaces and also beyond the corner regions and has a constant height along its entire periphery.

Accordingly, it is an object of the invention to provide a cutting insert which has a reduced tendency to allow material deposits to form thereon during chip breaking.

SUMMARY OF INVENTION

The cutting insert according to the invention has a rake surface which, particularly in the corner zones of the cutting edges, changes into an adjoining plateau surface by means of a step which is highest at those locations. By virtue of the curvature of the corner cutting edges, the zone of the chip that runs from the corner cutting edge may have flow and breakage properties different from those pertaining to the remainder of the chip. The step which has a particularly great height in the corner region provides for a good protection against an impacting of the chip on the top surface of the cutting insert. Particularly when using the cutting insert according to the invention in face-milling cutters, where chip breaking also takes place at the corner cutting edges, a reduced tendency of material accumulation is manifestly present at surface regions which border the rake surface and particularly in corner zones. This provides for a longer service life of the cutting inserts if the assumption can be made that a wear of the cutting inserts is reduced, for example, as a result of eliminating material accumulation and damages to the coating caused thereby. The cutting insert may also find application in a lathe.

Further, the reduced tendency of material accumulation on surface regions adjoining the rake surfaces is of advantage as concerns a correct indexing of the cutting insert. This applies particularly if the cutting insert is of the invertible type. In such cases the top surface adjoining the rake surface may serve as a seating surface after inverting the cutting insert. In case the top surface has remained free from deposits after first use of the cutting insert, deposits cannot adversely affect the correct indexing of the cutting insert when the latter is subsequently used in its inverted position.

According to an advantageous embodiment of the cutting insert, the base body has two cutting edges formed at opposite sides, so that the cutting insert may be used as an invertible cutting insert. Preferably, the upper side and the underside of the cutting insert are congruent.

In principle, the cutting insert may be of triangular or polygonal construction; a quadrangular shape is preferred. This results on the top side and on the underside in four effective cutting edges each. In such a case the invertible cutting insert may be installed in eight positions, that is, it has eight separately usable cutting edges.

It is particularly advantageous to provide that at each cutting edge corner the rake surface changes with a step into a plateau surface. This arrangement is advantageous in that a material accumulation and a buildup of deposits on the seating surface (plateau surface) are prevented at each cutting edge corner. This is of particular advantage in invertible cutting inserts where on each side and on each cutting edge corner material removal, that is, chip breaking work may be potentially performed.

The height of the step which separates the rake surface from the adjoining plateau surface is preferably so dimensioned dependent from the material to undergo chip breaking, that such height is sufficient to keep the chips, formed at the cutting edge, away from the plateau surface. The plateau surface is thus advantageously not swept over by the chips. In any event, the chips do not run forcefully onto the plateau surface.

Preferably, the greater the positive rake angle at the rake surface, the greater the step height. In this manner, cutting inserts having a step of substantial height, that is, having a deeply recessed plateau surface, are particularly well adapted for cutting inserts with a small wedge angle. The geometry of the cutting insert makes possible to obtain positive radial and axial rake angles in case of a negative installation of the cutting insert in either the axial or the radial direction.

The lateral surfaces are preferably planar and are preferably oriented at an angle of 90° to a central plane of the cutting insert. In this manner a positive clearance angle is obtained at the cutting insert only if the cutting insert is installed at a negative angle. The lateral surfaces which constitute the clearance surfaces, may be faceted. For example, the region of the clearance surface adjoining the cutting edge defines an outward-directed, that is, a convex, obtuse angle with the remaining lateral surface. This is possible and advantageous in case of a highly positive geometry of the cutting insert, that is, in cases where the wedge angle at the cutting edge is relatively small, for example, less than 60° or 70°. The cutting insert according to the invention may be formed as a tangential insert or a radial insert, determined by the orientation of the securing bore. In case of a radial cutting insert, the securing bore passes through the plateau surfaces. If, however, the securing bore is oriented parallel to the plateau surface surrounded by the rake surface, a tangential cutting insert is obtained.

In preferred embodiments the rake surface extends in a gapless manner about the plateau surface and borders the plateau surface with a likewise gapless step. A protection against a buildup of deposits (smear-on) is thus ensured for the entire plateau surface. In this connection it has been found expedient for the step to have its maximum height at the respective cutting edge corners.

BRIEF DESCRIPTION OF DRAWING

The objects and advantages of the invention will become apparent from the following detailed description of preferred embodiment thereof in connection with the accompanying drawings and in which like numerals designate like elements.

FIG. 1 is a perspective view of a face-milling cutter provided with cutting inserts according to the invention.

FIG. 2 is a side elevational view of the face-milling cutter of FIG. 1.

FIG. 3 is a perspective view of a cutting insert of the face-milling cutter of FIGS. 1 and 2.

FIG. 4 is a top plan view of the cutting insert of FIG. 3.

FIG. 5 is a side elevational view of the cutting insert of FIG. 3.

FIG. 6 is a detail of the face-milling cutter of FIG. 1.

FIG. 7 is an exploded view of the face-milling cutter of FIG. 6.

FIG. 8 is a detail of the tool body of the face-milling cutter of FIG. 6.

FIG. 9 shows the face-milling cutter of FIG. 1 with an occupied and an unoccupied insert seat.

FIG. 10 is an enlarged top plan view of the cutting insert of FIG. 3.

FIG. 11 is an enlarged side elevational view of the cutting insert of FIG. 3.

FIG. 12 is an enlarged perspective view of the cutting insert of FIG. 3.

FIG. 13 is a top plan view of a modified embodiment of a cutting insert according to the invention.

FIG. 14 is a side elevational view of the cutting insert of FIG. 13.

FIG. 15 is a perspective view of the cutting insert of FIG. 13.

FIG. 16 is a perspective view of a modified face-milling cutter provided with cutting inserts according to the invention.

FIG. 17 is a side elevational view of the face-milling cutter of FIG. 16.

FIG. 18 is a perspective view of a cutting insert of the face-milling cutter of FIG. 16.

FIG. 19 is a top plan view of the cutting insert of FIG. 18.

FIG. 20 is a side elevational view of the cutting insert of FIG. 18.

FIG. 21 is a fragmentary showing of the face-milling cutter of FIG. 16.

FIG. 22 is an enlarged top plan view of a cutting insert for the face-milling cutter of FIG. 16.

FIG. 23 is an enlarged view of the cutting insert of FIG. 20.

FIG. 24 is an enlarged view of the cutting insert of FIG. 18.

FIGS. 25 and 26 are perspective views of modified embodiments of the cutting insert for use as tangential inserts.

DETAILED DESCRIPTION OF PREFERRED EMBODIMENTS

Figure 27:
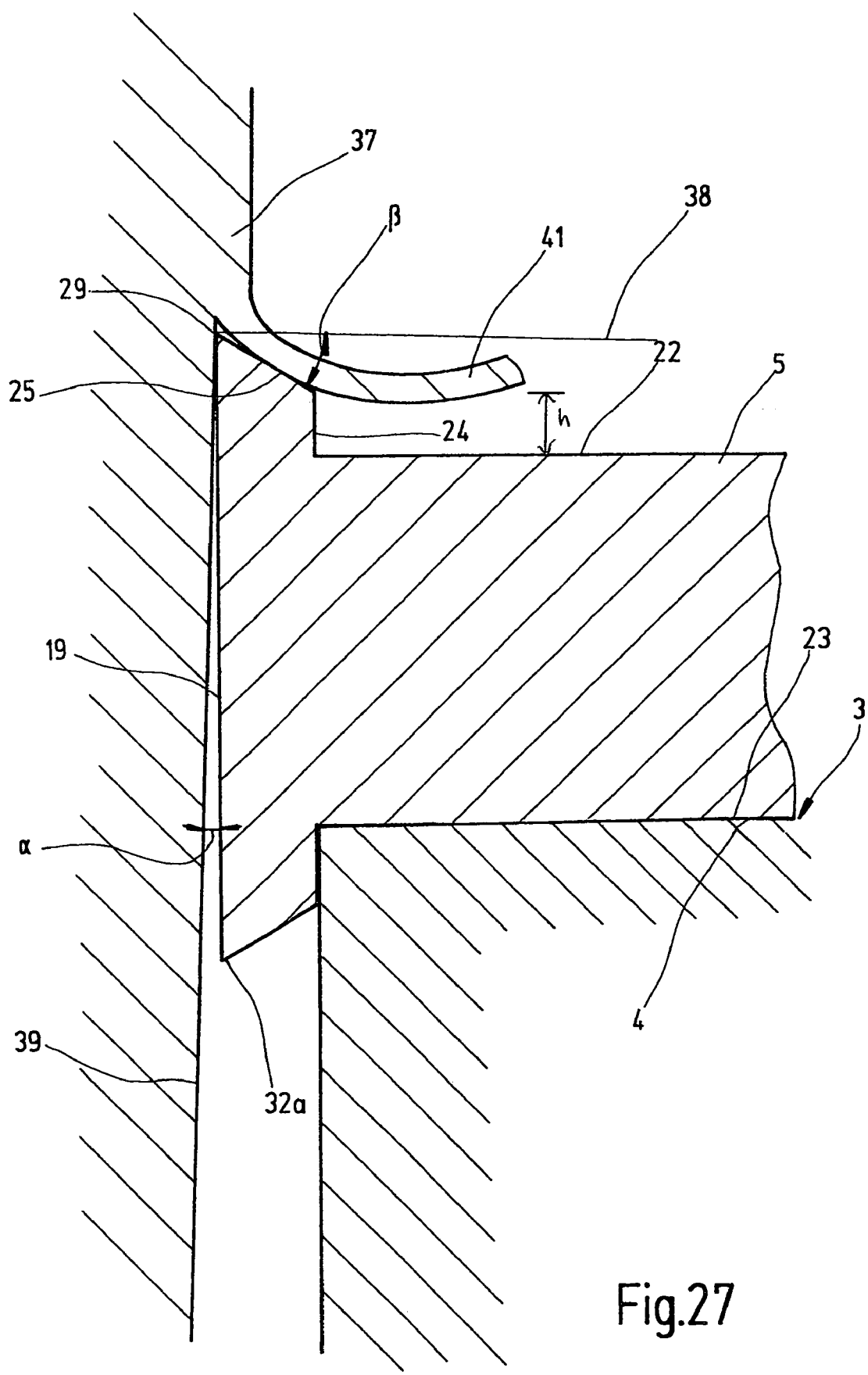
FIG. 27 is a sectional view illustrating relationships during chip breaking operation with a cutting insert according to the invention.

FIG. 1 shows a face-milling cutter 1, including a tool body 2 provided with insert seats 3. The insert seat 3, which is shown separately in FIG. 9, has a planar seating surface 4 for directly contacting a cutting insert 5. The seating surface 4 is, for example, rectangular, and is free-standing along all four edges (see especially FIG. 8). Adjacent the seating surface 4 at least two lateral supporting surfaces 6, 7 are provided, which are oriented perpendicularly to the seating surface 4 and are spaced respectively from two of the seat's edges.

The lateral supporting surfaces 6, 7 are formed directly on the tool body 2 and belong to the insert seat 3 for lending a lateral support to the cutting insert. Also referring to FIGS. 7 and 8, at the insert seat a threaded bore 8 is formed which passes through the seating surface 4 at a slight oblique angle thereto and with which a securing screw 9 is associated. On the tool body 2 additional cutting insert seats are arranged which correspond to the cutting insert seat 3 and which are arranged in path concentric to a rotary axis of the tool body 2.

At every insert seat identical cutting inserts 5 are arranged. Each cutting insert as may be observed in FIG. 2, has an active cutting corner, the inserts arranged-so that the respective diagonals of the insert-are oriented approximately parallel to the rotary axis D.

The identically constructed cutting inserts 5 are shown separately in FIGS. 3 to 5 and 10 to 12. The cutting insert 5 includes a base body 11 having a square outline as shown in FIGS. 4 and 10. The insert includes top and bottom surfaces interconnected by a peripheral surface defined by lateral surface portions 16, 17, 18, 19 and corners. At its four corners the cutting insert 5 may be provided with respective corner chamfers 12, 13, 14, 15 which, for example, may be planar surface regions or facets arranged between adjoining, preferably planar lateral surface portions 16, 17, 18, 19. The transition from the corner chamfers 12 to 15 to the respective adjoining lateral surface portions 16 to 19 may be effected by respective sharp or slightly rounded edges which extend parallel to a securing bore 21 passing through the base body 11.

The securing bore 21 is surrounded at the planar top side of the insert by a plateau surface 22 and at the insert bottom side by a plateau surface 23. The latter, as may be observed in FIG. 7, serves for being seated on the seating surface 4. The plateau surface 22 serves for being seated on the seating surface 4 when the cutting insert 5 is inverted. The top and bottom surfaces are of identical structure, and consequently, a description of the top surface equally applies to the bottom surface.

The plateau surface 22 is essentially square and planar. It terminates at a distance from the lateral surface portions 16, 17, 18, 19 in an all-around (i.e., surrounding) step 24 which includes lateral stop portions 24a-24d that extend approximately parallel to respective lateral surface portions 16, 17, 18, 19. In the vicinity of the corner chamfers 12, 13, 14, 15 the step 24 includes respective corner step portions 24e-24h.

The step 24 is adjoined by an all-around extending (surrounding) rake surface 25, which is inclined with respect to the plateau surface 22, i.e., inclined upwardly from the step 24. The rake surface comprises a plurality of rake surface portions 25a-25d disposed along respective lateral surface portions 16-19. Between the rake surface 25 and the peripheral surface a cutting edge is formed. That is, between the lateral rake surface portions and respective lateral surfaces 16, 17, 18, 19, respective cutting edge portions 26, 27, 28, 29 are defined. Further, the corner rake surface portions and the corner chamfers 12, 13, 14, 15 define respective corner cutting edge portions 32, 33, 34, 35.

A corresponding cutting edge arrangement is formed on the bottom side of the base body 11. The lateral cutting edge portions and corner cutting edge portions at the bottom side of the base body 11 are distinguished in FIGS. 11 and 12—inasmuch as visible—by a letter index "a".

The corner cutting edge portions 32 to 35 (32a to 35a) are preferably approximately linear. Likewise, the lateral cutting edge portions 26 to 29 (26a to 29a) are essentially linear, but have a preferably slightly sagging course (as viewed in a direction parallel to the plateau surface), so that the cutting corners formed at the respective ends of the cutting edge portions 26 to 29 (26a to 29a) rise prominently above the plateau surface 22. The rake surface 25 preferably has a constant inclination. The step 24 has its smallest height h (see FIG. 27) approximately in the middle of the sagging lateral cutting edge portions 26 to 29 (26a to 29a). In contrast, the step 24 has its greatest height in the corner step portions 24e-24h: The lateral step portions are linear as viewed perpendicularly to the top surface and extend parallel to the respective lateral cutting edge portions.

While the rake surface 25 may be precision-made, for example, by a grinding process, it is finished generally by sintering. The plateau surface 22 is submitted to a grinding process and is preferably an unworked surface, such as obtained by sintering and possibly by a subsequent coating.

The cutting insert 5 is preferably symmetrical with respect to a central plane 36 which is indicated by a dash-dot line 36 in FIG. 11 and which passes through the center of gravity of the base body 11 between the top and bottom surfaces. The axis of the securing bore 21 is oriented perpendicularly to the central plane 36.

The fastening of the cutting insert 5 to the insert seat is separately shown in FIGS. 6 and 7. The size of the seating surface 4 corresponds to that of the plateau surface 23. The position is set such that the lateral surface portions 16 and 19 of the cutting insert 5 lie against the adjoining engagement surfaces 6, 7 of the insert seat, when the plateau surface 23 assumes its position on the seating surface 4. The preferably slightly obliquely oriented threaded bore 8 forces an oblique seating of the securing screw 9, whose head, as a result, presses not only the plateau surface 23 against the seating surface 4, but also presses the lateral surface portions 16, 19 against the engagement surfaces 6, 7. By virtue of such an arrangement the cutting insert 5 is held as shown in the enlarged FIG. 27. The orientation of the cutting insert 5 is overall negative; this applies to the axial direction parallel to the rotary axis D as well as to the respective radial direction.

FIG. 27 illustrates the cutting edge 29 as it cuts into a workpiece 37. The associated radial direction related to the rotary axis of the tool is shown by a line 38 touching the main cutting edge 29. The clearance surface (lateral surface portion 19) defines an angle less than 90° with the line 38, whereby a positive clearance angle α is obtained between the lateral surface portion 19 and the adjoining upper surface 39 of the workpiece 37. At the same time, a positive rake angle β is obtained between the rake surface 25 and the radial direction indicated by the line 38. The positive rake angle β is obtained in spite of the negative installation of the cutting insert 5 by virtue of its small wedge angle at the cutting edge portion 29.

The face-milling cutter 1 described so far functions as described below.

During operation, the tool body 2 rotates about the rotary axis D, and is simultaneously moved perpendicularly to the rotary axis D along the workpiece surface 39. The lateral cutting edge portions 29 of the inserts are the main cutting edges, and the corner cutting edge portions 35 which are oriented perpendicularly to the rotary axis D are the secondary cutting edges that are guided, while performing a slight chip breaking work, in a circular motion over the produced planar surface.

The main chip breaking work is performed at the cutting edge portions 29 where, as shown in FIG. 27, chips 41 are formed which are lifted off the workpiece surface 39. The chips 41 run over the rake surface 25 and are bent at the same time. Such a bend or curving prevents the chips 41 from running onto the plateau surface 22 recessed by the step 24. Rather, the chips 41 run freely outward over the step 24 and flow away from the plateau surface 22 as a result of the bending imparted thereon inside, in the vicinity of the corner cutting edge portion 35 or, respectively, at the lateral cutting edge portion 26. The chips 41, to be sure, contact the plateau surface 22 with a slight pressure, but do not, in any event, run steeply and firmly onto the plateau surface 22. Consequently, no deposits from the chips form on the plateau surface 22 and, in particular, the plateau surface is not exposed to a smear-on effect. The plateau surface 22 may thus serve in its entirety as a seating surface when the cutting insert 5 is inverted in the insert seat 3. For such an inversion, the securing screw 9 is loosened and the cutting insert 5 is turned over such that its plateau surface 23 will be located on the top and its plateau surface 22 will lie against the seating surface 4. Consequently, the corner cutting edge portion 35a and, respectively, the lateral cutting edge portion 28a will become the active cutting edges, as shown in the arrangement in FIG. 24. The positioning of the cutting insert 5 is feasible without appreciable problems due to the unsoiled plateau surface 22.

FIGS. 13 to 15 show a modified embodiment of the cutting insert 5, which may be installed on the insert seats 3 without needing any alterations of the tool body 2. The modified cutting insert 5 differs from the previously described cutting insert 5 by the provision of raised surface regions 42, 43, 44, 45 formed on the plateau surface 22. The raised surface regions 42 to 45 are provided on elevations which are situated at a lower level than the step 24. The surface regions 42 to 45, which may have approximately triangular borders, are situated particularly in the vicinity of the cutting insert corners. Approximately in the middle of the lateral cutting edge portions 26 to 29 a respective gap is present between the raised plateaus on which the surface regions 42 to 45 are provided. The gap is formed in each instance in that region of the step 24 which has the smallest height.

Further, as a departure from the above-described embodiments, the rake surface 25 may be provided with chip-breaking grooves 46, 47, 48, 49, 50, 51, 52, 53, 54, 55, 56 which extend parallel to the lateral cutting edge portions 26 to 29 as well as approximately parallel to the corner cutting edge portions 32, 33, 34, 35. The reverse side of the invertible cutting insert 5 according to FIG. 13 is identically structured.

The invertible cutting insert 5 according to FIGS. 13 to 15 described so far is, due to the chip-breaking grooves 46 to 56, also adapted for chip breaking from materials which tend to yield chips of appreciable length. Further, such an invertible cutting insert 5 is particularly insensitive to smear-on. In the corner regions where the step 24 has a relatively great height, the surface regions 42 to 45 which are arranged there and which serve for indexing, are situated in the shadow of the respective adjacent step 24 and are thus protected from being smeared on by the chips passing thereover.

In the central regions of the lateral cutting edge portions 26, 27, 28, 29 the step 24 has a lesser height. In case chips impact in these regions on the plateau surface 22 and, as a result, leave traces, such an occurrence is substantially harmless, since the plateau surface 22 does not function as a seating surface in those noted regions. Rather, such a function is taken over by those raised surface regions 42 to 45 which are situated in the corners of the cutting insert 5. The surface regions 42 to 45 may directly adjoin the step 24 or, as shown in FIGS. 13 and 15, may be situated at a given distance therefrom. The surface regions 42 to 45 which are preferably arranged around the securing bore 21, provide for a secure seat of the cutting insert 5 on the insert seat 3.

A further variant of an embodiment of a face-milling cutter 1 and an associated cutting insert 5 are illustrated in FIGS. 16 through 24. In the absence of an expressly different description, the foregoing description in conjunction with the same reference numerals applies.

The above-described cutting inserts 5 are of symmetrical structure with respect to the central plane (line 36) as well as with respect to planes which contain the bore axis of the bore 21 and which are oriented parallel to the lateral surfaces or diagonally to the square defined by the lateral surfaces. A lesser symmetry characterizes the cutting inserts according to FIGS. 18 to 20 and 22 to 24, respectively, they are of asymmetrical construction with respect to the central plane designated by (line 36 in FIG. 23). The lateral cutting edge portions 26, 26*a*, 27, 27*a*, 28, 28*a*, as well as 29, 29*a* are in each instance arranged pair-wise parallel to one another and are preferably linear. They are, however, disposed at an inclination to the central plane. The same applies to the corner cutting edge portions 32, 32*a*, 33, 33*a*, 34, 34*a*, 35, 35*a*. Here too, as may be observed in FIG. 24, the step 24 extends all around; it has its greatest height in the region of the corner cutting edge portions 32 to 35. The rake surface 25 has, as in the previous embodiments, a constant inclination to the central plane. It is, however, also feasible to purposefully increase or reduce the inclination particularly in the region of the corner cutting edge portions 32 to 35 to obtain special cutting properties. Particularly an increase of the rake angle may yield advantageous results in certain chip-breaking tasks. The problem of a smear-on onto the plateau surface 22 is mitigated or prevented by the substantial height of the step 24.

The cutting insert 5 according to FIGS. 18 to 20 (22 to 24) provides for a particularly large positive rake angle in a negative installation as seen in FIG. 21. Due to the perpendicular orientation of the lateral surface portions 16, 17, 18, 19 to the central plane 36, the cutting insert 5 is regarded as a negative insert. In case of a negative installation still a large positive rake angle and clearance angle are obtained. Such a cutting insert is adapted for cutting critical materials such as aluminum, soft steel and special steel. The cutting insert 5 has its greatest thickness at the cutting edge, while its smallest thickness is in the insert center. Such a structure provides for an optimal utilization of volume and the material of the cutting insert. Due to its geometry, the cutting insert 5 is simple to manufacture. Further, the insert may be ground at the lateral surface portions 16, 17, 18, 19, at the corner chamfers 12, 13, 14, 15 and at the rake surface 25 (25*a*) without encountering appreciable technological problems. The cutting insert 5A illustrated in FIGS. 22 to 24 further makes possible particularly large axial angles (in case of a negative radial and axial installation in the tool body 2).

The cutting insert has eight lateral and corner cutting edge portions (26 to 29 and 26*a* to 29*a*) which may become effective in sequence and consequently, the cutting insert has a long service life. The lateral cutting edge portions 26 to 29 as well as 26*a* to 29*a* are, as a rule, exposed to a working load from their respective corner cutting edge portions only to the center, because such a milling tool is used in the axial direction mostly only with a cutting depth which uses merely one half of the cutting edge length. Consequently, the utilized cutting inserts which had been installed, for example, in a rightward-cutting tool, may be reused in a leftward-cutting tool in up to eight different positions. The geometrical configuration has no interfering edges, whereby a free chip flow is ensured. The cutting edge of the cutting insert 5 according to FIGS. 10 to 12 as well as FIGS. 13 to 15 is arranged axially symmetrically. The cutting edge of the invertible cutting insert according to FIGS. 22 to 24 is arranged at 90°, and 180°, respectively, in a rotationally symmetrical manner. The rotational symmetry of 90° relates to the bore axis of the securing bore 21, while the rotational symmetry of 180° relates to the inversion of the cutting insert 5, when the top side and the underside of the cutting insert switch places.

For using cutting inserts in tool bodies with tangential installation, cutting inserts 5B according to FIG. 25 or, in the alternative, inserts 5C according to FIG. 26 may be provided. The cutting insert 5B shown in FIG. 25 has a rectangular base body 11, whose lateral cutting edge portions 26, 27, 28, 29 are formed on a narrow side of the base body 11. Between the lateral cutting edge portions 26 to 29, corner cutting edge portions 32, 33, 34, 35 are provided. The lateral surface 17 adjoining the lateral cutting edge portion 27 is narrow, while the lateral surface portion 18 adjoining the lateral cutting edge portion 28 has a large quadratic area. The same applies to the oppositely located lateral surface portion 16 hidden in FIG. 25. The securing bore 21 extends from the lateral surface portion 18 to the lateral surface portion 16. The lateral surface portions serve as engagement surfaces for the engagement surface 6 at a respective insert seat. The surface normal of the seating surface 4 is oriented, for example, in the circumferential direction. The lateral surfaces are faceted. The lateral cutting edge portions 26, 27, 28, 29 and the corner cutting edge portions 32, 33, 34, 35 are adjoined by partial surfaces, of which the partial surfaces 18', 17' and 14' are visible in FIG. 25. As a result of this arrangement, the cutting insert 5B according to FIG. 25 has a strongly negative geometry. The rake surface 25, however, is positively set to such an extent that in case of a strongly negative installation of the cutting insert 5B a positive rake angle is obtained.

The step 24, which may have a wavy border as viewed in a direction perpendicular to the axis of the hole 21 (see also FIG. 25), separates the plateau surface 22 all around from the rake surface 25. The step 24 has its greatest height in the region of the corner cutting edge portions 32 to 35.

The cutting insert 5C shown in FIG. 26 differs from the earlier described structures in that the corner cutting edge portions 32, 33, 34, 35 are rounded. Accordingly, the corner chamfers 12 to 15 are curved surface regions. In other respects the earlier description applies.

A cutting insert 5B, 5C, intended for use, for example, in a face-milling cutter, has an all-around extending rake surface 25 which changes into a plateau surface 22 by an uninterrupted step 24. The step 24 reaches its greatest height in the corner regions of the cutting insert 5. The rake surface 25 defines a positive rake angle. The step 24 prevents the produced chips from running onto the plateau surface 22. As a result of such a measure a smear-on of material on the plateau surface 2-2 is prevented. The cutting insert may also be used in a lathe or other chip-breaking tool.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting insert comprising a multi-cornered base body including top and bottom surfaces interconnected by a peripheral surface; the peripheral surface including lateral surfaces and corner surfaces interconnecting the lateral surfaces; at least one of the top and bottom surfaces constituting a cutting surface; a cutting edge disposed between the cutting surface and the peripheral surface, the cutting edge including lateral cutting edge portions and corner cutting edge portions; the lateral cutting edge portions being disposed along respective lateral surfaces, and the corner cutting edge portions being disposed along respective corner surfaces; the lateral cutting edge portions being interconnected by the corner cutting edge portions; the cutting surface further including a plateau surface and a rake surface, the plateau surface defining a seating surface; the rake surface surrounding the plateau surface and situated between the plateau surface and the cutting edge; the rake surface including lateral rake surface portions and corner rake surface portions; the lateral rake surface portions extending along respective lateral cutting edge portions, and the corner rake surface portions extending along respective corner cutting edge portions; a step disposed between the plateau surface and the rake surface and extending upwardly with respect to the plateau surface; the step including lateral step portions and corner step portions; the lateral step portions extending along respective lateral rake surface portions, and the corner step portions extending along respective corner rake surface portions; wherein the corner step portions extend uninterruptedly along the respective corner rake surface portions; the step being of varying height, wherein a maximum height is disposed at the corner step portions.

2. The cutting insert according to claim 1 wherein at least two of the lateral cutting edge portions are disposed parallel to one another.

3. The cutting insert according to claim 1 wherein there are at least two pairs of lateral cutting edge portions, wherein the lateral cutting edge portions of each pair are parallel to one another.

4. The cutting insert according to claim 1 wherein the base body is of substantially rectangular shape as viewed perpendicularly to the cutting surface.

5. The cutting insert according to claim 4 wherein the substantially rectangular shape is a square shape.

6. The insert according to claim 1 wherein the step interconnects the plateau surface and the rake surface.

7. The cutting insert according to claim 1 wherein the step is arranged to direct chips away from the plateau surface.

8. The cutting insert according to claim 1 wherein the rake surface defines a positive rake angle.

9. The cutting insert according to claim 1 wherein the peripheral surface and the rake surface are oriented to define therebetween a wedge angle smaller than 90° for the cutting edge.

10. The cutting insert according to claim 1 wherein the lateral surfaces define clearance surfaces.

11. The cutting insert according to claim 1 wherein the lateral surfaces are oriented perpendicularly to an imaginary center plane passing through the insert between the top and bottom surfaces.

12. The cutting insert according to claim 1 wherein the lateral surfaces are of planar shape.

13. The cutting insert according to claim 1 wherein the peripheral surface includes a first portion defining a clearance surface of the cutting edge, and a second portion spaced from the cutting edge and forming an obtuse angle with the first portion.

14. The cutting insert according to claim 1 wherein a bore passes through the base body from the top surface to the bottom surface.

15. The cutting insert according to claim 1 wherein the step extends continuously along the entire rake surface.

16. The cutting insert according to claim 1 wherein a minimum height of the step occurs midway between adjacent corners.

17. The cutting insert according to claim 1 wherein a minimum height of the step occurs between adjacent corners and is situated closer to one of the corners.

18. The cutting insert according to claim 1 wherein each lateral step portion is linear as viewed perpendicularly to the cutting surface.

19. The cutting insert according to claim 1 wherein each lateral step portion is wavy as viewed perpendicularly to the cutting surface, wherein each lateral rake surface portion is of varying width.

20. The cutting insert according to claim 1 wherein a bore passes through the base body from one lateral surface to another lateral surface.

21. The cutting insert according to claim 1 wherein each of the top and bottom surfaces constitutes a cutting surface and is configured the same as the other.

22. The cutting insert according to claim 21 wherein the plateau surface includes at least one raised surface region defining a support surface for the insert.

* * * * *